United States Patent [19]

Ramsey

[11] Patent Number: 4,540,389

[45] Date of Patent: Sep. 10, 1985

[54] BELT SPLICING DEVICE

[75] Inventor: Earl A. Ramsey, Carrollton, Tex.

[73] Assignee: Maxi-Lift, Inc., Dallas, Tex.

[21] Appl. No.: 481,363

[22] Filed: Apr. 1, 1983

[51] Int. Cl.³ .............................................. F16G 3/08
[52] U.S. Cl. ........................................ 474/257; 24/37
[58] Field of Search ...................... 474/257, 255, 253; 24/37, 135 R, 135 A, 135 K

[56] References Cited

U.S. PATENT DOCUMENTS

| 8,514 | 6/1886 | Whitehead | 24/37 |
| 1,643,037 | 9/1927 | Vollrath | 24/37 |
| 1,686,300 | 10/1928 | Vollrath | 24/37 |
| 4,056,867 | 11/1977 | Wert et al. | 24/37 |

Primary Examiner—Stephen J. Novosad
Assistant Examiner—Thuy M. Bui
Attorney, Agent, or Firm—Kenneth R. Glaser

[57] ABSTRACT

A device for splicing ends of a belt together in juxtaposed relation includes a central generally planar spacer element and two outer generally planar belt clamping elements. The ends of the belt are positioned between the spacer and respective clamping elements so that the clamping effect occurs across the mating surfaces thereof. A through bolt and nut are used to tighten the spacer, belt and clamping element arrangement together. The generally planar surfaces of the spacer element transform into oppositely, outwardly curving belt engaging surfaces at opposite edges thereof, resulting in a form of "I" or "bone" cross-section. The opposing surfaces of the two belt clamping elements have complementing inwardly curving belt engaging surfaces that cooperate to pre-tension the belt as the clamping elements are tightened together. Each of the opposing belt engaging surfaces is formed with parallel linear ridges, or corrugations, which cooperate to deform the belt material slightly in order to retain the belt ends in juxtaposed relation within the belt splicer.

3 Claims, 5 Drawing Figures

BELT SPLICING DEVICE

BACKGROUND OF THE INVENTION

1. Field of the Invention

The present invention relates generally to clamping devices for clamping together in juxtaposed relation two ends of a belt of the type used in heavy industry, and more specifically to a belt splicing device of this sort having a strain relieving curved belt gripping surface at the leading edge of the clamp, in combination with a similar curved belt gripping surface at the outer edge of the belt.

2. Description of the Prior Art

Belt splicing devices of the type having a central spacer section and two outer clamping sections are in wide use today. The most recent version of this type of belt clamp incorporates mating rounded or curved section along the leading edge of the clamp and spacer to effect a curved transition from the tension plane of the belt to the actual clamping surface of the belt, normal thereto. This device also incorporates a plurality of pointed extensions on the belt gripping surface that pierce into the material of the belt to aid in retaining the belt in functional position between the spacer element and two outside clamping sections. This idea has proved to be not necessarily an improvement over prior devices, in that the primary clamping function is along the straight, flat sections of the spacer element and mating clamping elements, which results in areas of belt tension concentration along the curved transition section of the clamping device.

SUMMARY OF THE INVENTION

A belt splicing device for splicing belt ends together in juxtaposed relation comprises a generally planar center spacer element and two outer generally planar belt clamping elements. The belt ends are disposed between the spacer element and respective clamping elements so that the clamping elements are drawn together thereupon by a through bolt and nut tightening arrangement. The two generally planar sides of the spacer element transform into oppositely, outwardly curving belt engaging surfaces at two opposite ends thereof, resulting in a form of "I" or "bone" cross-section. The opposing surfaces of the two belt clamping elements have complementing inwardly curving belt engaging surfaces that cooperate to pre-tension the belt as the clamping elements are tightened together.

BRIEF DESCRIPTION OF THE DRAWINGS

For a detailed description of the preferred embodiment of the invention, reference is made to the accompanying drawings wherein.

DETAILED DESCRIPTION OF THE INVENTION

Figure 1:
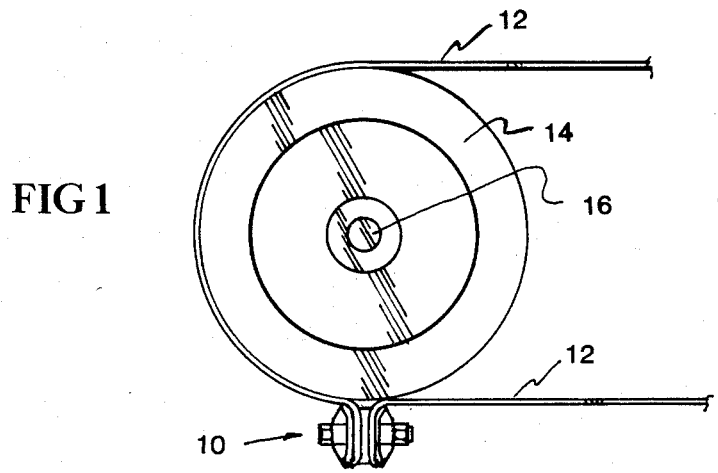
FIG. 1 is a schematic view of the belt splice as that splice passes over a pulley.

Turning now to the drawings, and more specifically to FIG. 1, the belt splicing device of the present invention is shown, generally illustrated by the numeral 10, as the belt splicing device would be utilized in splicing two ends of a typical industrial power belt 12 together. As shown schematically, the industrial power belt 12 is shown positioned about a pulley 14 which rotates about a shaft 16.

Figure 2:
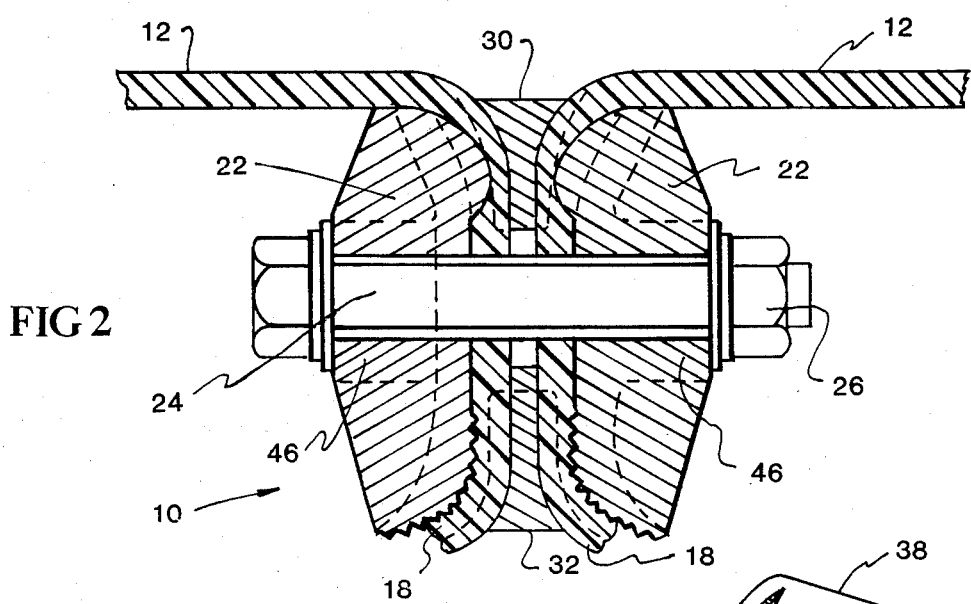
FIG. 2 is an enlarged vertical sectional view of the belt splicing device of the present invention, oriented as shown in FIG. 1.

The belt splice is best shown in FIG. 2. The belt 12 terminates in belt ends 18, which are retained in juxtaposed position within the belt splicing device 10. The belt splicing device 10 comprises a generally elongate planar spacer element 20 and a pair of essentially planar belt clamping elements 22, in juxtaposed position about the spacer element and the belt ends 18. As shown, the elongate spacer element 20, the belt ends 18, and the pair of belt clamping elements 22 are retained in functional position by a bolt 24, to which is threadedly attached a nut 26 in the customary manner to draw the belt clamping elements toward one another to clamp the belt ends securely in place.

Figure 3:
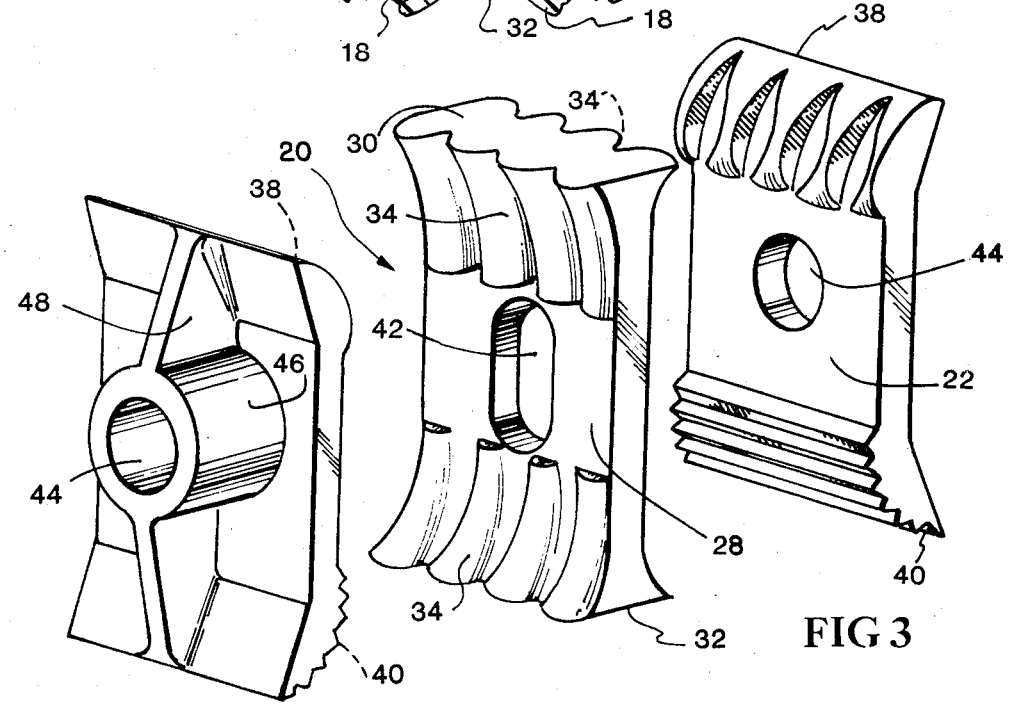
FIG. 3 is an exploded perspective view of the belt splicing device of the present invention.

A preferred embodiment of the spacer element 20 and the belt clamping elements 22 comprising the belt splicing device 10 of the present invention, are best shown in exploded form in FIG. 3. The spacer element 20 is generally planar in form and slightly elongate (in the vertical direction as shown in the drawings). The spacer element 20 has a generally planar central section 28 which terminates in first and second ends adjacent respective opposite edges 30, 32 in the axial direction as shown in FIG. 3. In the orientation shown, the first edge 30 is commonly referred to as the leading end of the belt splicing device and the second edge 32 is referred to as the trailing end thereof. As shown, each of these edges, 30, 32 or ends of the spacer element 20, terminate in divergently curving belt engaging surfaces 34 to result in a form of "I" or "bone" cross-section. As will be explained in greater detail hereinbelow, these divergently curving belt engaging surfaces 34 cooperate with mating surfaces on each of the opposing belt clamping elements to retain the belt ends in juxtaposed functional relation more efficiently than belt clamping devices presently known and utilized in the industry.

In the preferred embodiment of the spacer element 20 shown in FIG. 3, each of the divergently curving belt engaging surfaces 34 is formed of a series of adjacent, parallel essentially linear ridges, which define essentially parallel valleys therebetween, to result in an outwardly curving "scrubboard" pattern for gripping onto the belt ends 18. As will be explained in greater detail hereinbelow, it has been determined that this type of scrubboard pattern is most effective in slightly deforming the belt ends 18 to permit the belt material to "flow" into the valleys in order to better retain the belt ends in gripped position between the clamping elements and spacer element.

Also shown in FIG. 3, are the two identical belt clamping elements 22 adapted to mate with the planar spacer element 20 for optimum results. Each of the belt clamping elements 22 includes a generally planar central section 36 and first and second (leading and trailing) ends 38, 40, adapted to essentially conform to the configuration of the spacer element divergently curving belt engaging surfaces 34. As shown, these clamping element first and second ends 38, 40 are curved in a manner to complement the spacer element belt engaging surfaces 34 in a manner to tightly retain the belt ends 18 together in juxtaposed relation therebetween. Like the belt clamping surfaces of the spacer element 20, each end 38, 40 of the belt clamping element 22, is formed of a series of adjacent, parallel, essentially linear ridges which define essentially parallel valleys therebetween. In the preferred embodiment, the parallel linear ridges and valleys of the clamping element leading end 38 are oriented parallel to those of the mating leading end 30 of the spacer element 20 in a manner to cooperate to slightly deform the power belt ends 18 into a ripple pattern to aid in retaining the belt end in functional position. The parallel linear ridges and valleys of the belt clamping element trailing end 40 are oriented transverse to the linear pattern on the belt engaging surfaces of the spacer element second or trailing end 32 in a manner to slightly deform the belt end 18 into a type of checkerboard pattern. As shown, the clamping element trailing end ridges are sharp and much closer together, as compared with the leading (upper as shown in the drawings) end parallel ridge pattern, which has larger, smooth topped ridges. This smaller, transverse pattern is more effective in evenly distributing the gripping force over the surface area of the belt, and in constraining the belt end against movement in the axial direction (upwardly as shown in FIG. 2) as the belt is in use.

When the mating spacer element and clamping elements are clamped together upon the belt ends, the resulting ripple pattern of the belt material formed at the leading end of the splicing device has the effect of both reducing the linear deflection (stretching) and also improving the resistance to axial shear and belt delamination in the area of transition between the normal planes of axial tension.

By contrast, the transverse linear pattern of the clamping element trailing end belt gripping surface 40 is much more resistant to belt movement in the axial direction, resulting in a more even distribution of restraining forces across the entire contact surface area of the belt ends and spacer-clamping element interface to more effectively retain the belt ends 18 in juxtaposed functional position against both sustained and pulsed tension forces applied to the power industrial belt 12 as the belt is being used for its intended purpose.

As shown in the drawings, the spacer element 20 and each of the belt clamping elements 22 contain a through aperture 42, 44 respectively. These apertures are in alignment when the spacer element and the belt clamping elements are juxtaposed in functional relation in order that the threaded bolt and nut 24, 26 may be inserted therethrough to clamp the belt clamping elements down upon the belt ends 18 and the spacer element 20. As best shown in FIG. 3, the clamping element through aperture 44 also includes a cylindrical boss 46 formed about the aperture and in axial alignment therewith. Additionally, each belt clamping element 22 includes a pair of flat bosses 48 formed with the cylindrical boss 46 and with the back side of respective first and second ends of the belt clamping element. Those skilled in the art will readily appreciate that this particular construction of cylindrical boss and flat bosses imparts a structural integrity to the clamping element to prevent same from bending or breaking under tension pulses in the axial direction of the belt 12, while minimizing the bulk of material used in forming the belt clamping element.

As is best shown in FIG. 2, when the spacer element 20 and belt clamping elements 22 are juxtaposed in functional relation about the belt ends 18, as the nut 26 is tightened down around the bolt 24, the clamping elements are drawn together to compress the belt ends against the central spacer element. In so doing, the material of the power belt ends 18 is forced into the valleys and crevices between the parallel linear ridges of the belt engaging surfaces of the spacer element and the belt clamping elements. Those skilled in the art will appreciate that this deformation or flow of the belt material into the textured surface of the belt engaging and clamping surfaces results in a manyfold increase in shear resistance and an improved grip upon the belt ends that is essentially impossible to break.

Figure 4:
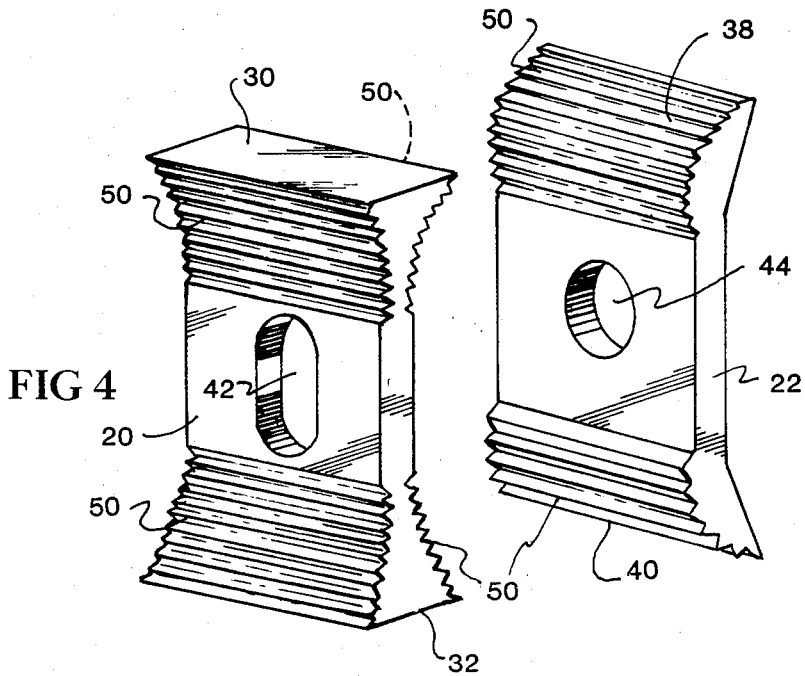
FIG. 4 is an exploded perspective view of an alternative embodiment of the spacer and one clamping element of the belt splicing device of the present invention.

FIG. 4 depicts an alternative embodiment of the belt engaging and gripping surfaces of the spacer element and belt clamping elements. As shown, the adjacent parallel linear ridges 50 are formed as those of the belt clamping element trailing end 40 of the preferred embodiment shown in FIG. 3. The linear ridges are oriented transverse to the effective direction of linear tension applied to the belt through the clamping device in order to inhibit or otherwise reduce the tendency of the belt ends to shift along the gripping surfaces in the direction of tension force thereon. In this embodiment shown in FIG. 4, as in the pattern of the clamping element trailing end belt gripping surfaces shown in FIG. 3, the linear ridges are much smaller and are positioned closely together to more evenly distribute the gripping force applied to the belt ends 18.

Figure 5:
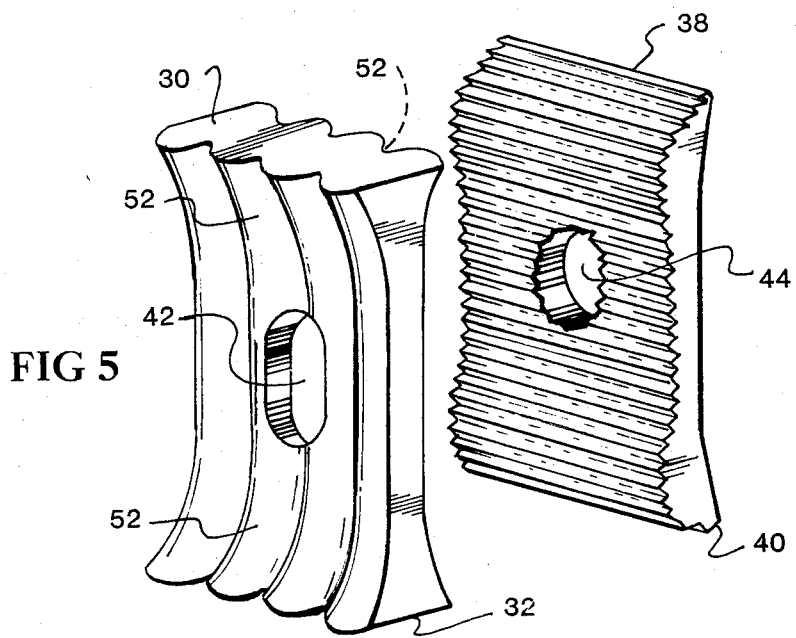
FIG. 5 is an exploded perspective view of a further embodiment of the spacer and one clamping element of the belt splicing device of the present invention.

In FIG. 5 is shown a second alternative embodiment of the belt splicing device of the present invention, in which the means for gripping and retaining the belt ends 18 cover the entire exposed surface area of the spacer element and the belt clamping elements that come in contact with the belt ends. In this embodiment, the pattern of parallel ridges 52 and valleys defining the belt gripping surface of the spacer element is in essentially axial alignment with the direction of tension applied to the belt, and the orientation of the linear ridges 50 and valleys defining the belt gripping and retaining surface of the belt clamping elements is essentially transverse to the direction of tension force applied to the belt. Those skilled in the art will appreciate that these particular orientations shown in FIG. 5 may be reversed, or the same orientation utilized in both the spacer element and the belt clamping elements on either side thereof without affecting the efficiency of the belt splicing device of the present invention.

OPERATION

In operation, a number of the belt splicing devices are arranged in side by side relation along the entire width of the belt to be spliced, as is customarily known to those skilled in the art. One of the belt clamping elements may be used as a pattern to punch clearance holes in the end of the belt through which the bolt is inserted when assembling the belt splicing device as shown in the figures.

A novel feature of the belt splicing device of the present invention is the effect on the belt itself as the clamping elements are tightened down on the belt. The particular design of the spacer element and belt clamping elements, specifically the divergently curving belt engaging surfaces on both the leading end and the trailing end of the spacer element, in cooperation with the mating inwardly curving belt engaging surfaces of the clamping elements, function to apply an initial pre-stress to the belt as the clamping elements are tightened together. As this pre-tensioning is being effected, the belt material is permitted to "flow" into the crevices and valleys defined by the essentially parallel linear ridges of the belt engaging surfaces to result in an initial stretching of the belt across the length thereof that is constrained between the spacer element and the belt clamping element. In this manner, this pre-tensioning or pre-stressing of the belt as the belt splicing device is tightened down thereupon, operates to distribute the shear forces acting upon the belt along the entire surface area of the spacer element and clamping elements that are in intimate contact with the belt ends, as opposed to a high concentration of tension shear stress building up along the belt in the area of the curved transition from the belt travel axis (horizontal as shown in FIG. 2) to the effective direction of shear stress (vertical as shown in FIG. 2) applied to the belt ends clamped between the spacer element and the belt clamping elements. Those skilled in the art will appreciate that this effect is accomplished without the use of small pins, cutting edges, etc., affixed to the belt restraining surfaces of belt splicing devices in common use today, which pins and cutting edges tend to pierce the surface, and occasionally the cords of the belts, thereby tending to reduce the ultimate tensile strength of the power belt. In this regard, the spacer aperture 42 is shown slightly elongated in the axial direction of belt tension. This permits limited axial movement of the spacer element with respect to the belt clamping elements to permit the spacer element to center itself and evenly distribute the tension created within the belt ends retained between the spacer element and the clamping elements as the belt splicing device is tightened down upon the belt ends.

From the foregoing it will be seen that this invention is one well adapted to retain all of the ends and objectives hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof; it is to be understood that all matter herein set forth or shown in the accompanying drawings is to be interpreted as illustrative and not in a limiting sense.

I claim:

1. A device for splicing ends of a belt together in juxtaposed relation, comprising:
   (a) a generally elongate spacer element having
      (1) a generally planar central section and
      (2) first and second ends adjacent respective opposite edges thereof, each of said first and second ends having two oppositely outwardly curving belt engaging surfaces;
   wherein each belt engaging surface of said spacer element first end comprises a series of adjacent, parallel essentially linear ridges defining parallel valleys therebetween;
   (b) a pair of belt clamping elements, each having
      (1) a generally planar central section, and
      (2) first and second ends adjacent respective opposite edges thereof, each of said first and second ends having an inwardly curving belt engaging surface for cooperating with a respective first and second ends outwardly curving belt engaging surface of said spacer element to retain the ends of the belt together in juxtaposed relation;
   wherein each belt engaging surface of each of said belt clamping element first ends opposing said spacer element first end belt engaging surfaces comprises a series of adjacent, parallel essentially linear ridges defining parallel valleys therebetween;
   wherein said linear ridges of said belt clamping element first end engaging surfaces are transverse to said linear ridges of said spacer element first end belt engaging surfaces; and,
   (c) clamp retaining means for drawing said belt clamping elements toward one another to clamp the ends of the belt together against said elongate spacer element.

2. The device of claim 1, wherein each belt engaging surface of said spacer element second end comprises a series of adjacent, parallel, essentially linear ridges defining parallel valleys therebetween;
   wherein each belt engaging surface of each of said belt clamping element second ends opposing said space element second end belt engaging surfaces comprises a series of adjacent, parallel, essentially linear ridges defining parallel valleys therebetween; and,
   wherein said linear ridges of each of said belt clamping element second end belt engaging surfaces are transverse to said linear ridges of said spacer element second end belt engaging surfaces.

3. A device for splicing the ends of a belt together in juxtaposed relation, comprising:
   (a) a generally planar spacer element having opposite essentially planar sides, each of said sides terminating in an axial direction in two oppositely outwardly curving sections, and having belt gripping means across the entire surface thereof, wherein said belt gripping means comprises a series of adjacent, parallel, essentially linear ridges defining parallel valleys therebetween that cooperate to retain the belt ends spliced together when said spacer element, belt ends and clamping elements are juxtaposed in functional position;
   (b) a pair of essentially planar belt clamping elements, each of said belt clamping elements having a side adapted to complement a side of said spacer element, and having belt gripping means across the entire surface thereof wherein said spacer gripping means are oriented in said axial direction relative to said spacer element and said clamping element gripping means are oriented in the transverse direction relative to said spacer element gripping means; and,
   (c) clamp retaining means for drawing said belt clamping elements toward one another to clamp the ends of the belt together against said planar spacer element.

* * * * *